United States Patent
Bangerter et al.

[11] Patent Number: 6,056,988
[45] Date of Patent: May 2, 2000

[54] PREPARATION OF A CHEWY SUGAR CONFECTIONERY PRODUCT

[75] Inventors: Ulrich Bangerter, Yokohama, Japan; Jamie Edward Geddes, Sandbach, United Kingdom

[73] Assignee: Nestec S.A., Vevey, Switzerland

[21] Appl. No.: 09/093,777

[22] Filed: Jun. 9, 1998

[30] Foreign Application Priority Data

Jun. 10, 1997 [EP] European Pat. Off. .............. 97304005

[51] Int. Cl.[7] ................... A23P 1/10; A23P 1/12; A23G 3/00
[52] U.S. Cl. ............ 426/576; 426/660; 426/512; 426/515; 426/520; 426/524
[58] Field of Search ..................... 426/515, 660, 426/512, 576, 573, 572, 516, 520, 524

[56] References Cited

U.S. PATENT DOCUMENTS

| | | | |
|---|---|---|---|
| 3,908,032 | 9/1975 | Didelot et al. | 426/660 |
| 4,086,371 | 4/1978 | Minifie et al. | 426/658 |
| 4,468,409 | 8/1984 | Metzroth | 426/659 |
| 4,744,997 | 5/1988 | Hoffmann et al. | 426/576 |
| 5,279,842 | 1/1994 | Escola Gallart et al. | 426/282 |
| 5,476,678 | 12/1995 | Walter et al. | 426/660 |

OTHER PUBLICATIONS

Minifie, Chocolate, Cocoa, and Confectionery: Science and Technology, Third Edition, Chapman & Hall, NY, NY, 1989 pp. 499–519,530–543,580–586 and 635.

Database Abstract, Derwent Information Ltd.,WPI Accession No. 93–412228/199351,abstract of Soviet Patent Publication No. 1 780 691 (1992).

Database Abstract, Derwent Information Ltd., WPI Accession No. 86–325073/198649, abstract of Soviet Patent Publication No. 2, 227 670(1986).

*Primary Examiner*—David Lacey
*Assistant Examiner*—Drew Becker
*Attorney, Agent, or Firm*—Vogt & O'Donnell, LLP

[57] ABSTRACT

A crystalline pumpable confection mass for obtaining a chewy confectionery product is provided by preparing a sugar-containing liquid medium, concentrating the medium, cooling the concentrated medium to a temperature below its sugar saturation point and kneading to induce sugar crystal nucleation, and then, the medium in which sugar crystallization was induced is heated to obtain a product which is pumpable and so that sugar crystal nucleates are retained in the heated product. To obtain a solidified product, the heated product is cooled, and additionally, the cooling and kneading and heating may be carried out in an extruder.

11 Claims, 4 Drawing Sheets

PREPARATION OF A CHEWY SUGAR CONFECTIONERY PRODUCT

BACKGROUND OF THE INVENTION

The present invention relates to a chewy confectionery product, in particular, a chewy confectionery product comprising crystallized sugar, and the invention relates to crystallyzation of a sugar solution to obtain a mass to obtain the product and forming the product into a shape and relates to molding procedures including depositing and injection molding.

Chewy products are well known in the sugar confection industry. A chew has a certain resistance to mastication both from flow past the teeth (toughness) and dissolution, i.e., the length of the chew. The length of the chew before full dissolution is normally a couple of minutes. It will be appreciated that this kind of product is different from chewing-gums, which are a gum-based confection which is not intended to be dissolved upon chewing.

The texture of a sugar confection varies with its crystallisation. A sugar confection's crystallisation depends on its nucleation, which is the formation of solute crystals prior to growth, and the crystallyzation growth, which is the process by which solute molecules build onto existing crystals and increase their size. The growth rate relies upon transfer of the solute from the bulk solution to the growing surface. Nucleation and growth rates may be controlled by selecting temperature, process and recipe conditions.

Traditionally, chewy sugar confectionery or candy is manufactured by heating, beating and whipping a sugar mass consisting of sugar, fats and water until it has the right consistency and forming it into a rope. The rope is then cut into pieces of a size suitable for consumption. The cutting is, for example, done by knives or by using a rotary die. Prior to the cutting, the chewy product is left for relaxation in order to allow molecular movements to take place in order to advance the nucleation, crystalline powder may be added to a sugar confection during the manufacturing.

Due to the nature of conventional manufacturing methods, the shaping of chewy products is limited to cutting and rotary die forming. Furthermore, the conventional methods require a relaxation step before cutting, packing and wrapping of the candies. Problems with cold flow are experienced for this type of manufacturing method.

The present invention aims to solve these drawbacks.

SUMMARY OF THE INVENTION

According to the invention it has surprisingly been found that it is possible to deposit or injection mould a chewy crystalline sugar confection while maintaining the chewy properties in the end product. A chewy product may be produced from a crystalline mass that is pumpable and thus it is possible to use alternative shaping methods.

In a first aspect, the invention provides a method for making a crystalline pumpable confection mass for a chewy confection product, said method comprising the steps of
  a) providing a liquid medium comprising sugar,
  b) concentrating the liquid medium,
  c) cooling the liquid medium below its saturation point and kneading it to induce formation of crystallisation therein, and
  d) heating the medium to a temperature effective to make the medium a pumpable confection mass while crystal structure is retained in it.

In a second aspect, the invention also relates to a chewy confection product made from a solidified, pumpable, crystalline mass of this to provide, in accordance with the invention, a chewy confectionery product comprising at least 80% sugar crystals having a size not bigger than 20 μm. Further, it has been found that this kind of product may be shaped by depositing or injection moulding. These shaping methods have the advantage that there are almost no limitations to the 3 dimensional shapes obtainable.

Furthermore, by reason of the process of the present invention, it has been found that with the pumpable state of the crystalline confection mass the relaxation step may not be necessary.

In addition, the process of the present invention allows smaller crystals to be achieved in the chew. It has been found as noted above, that chewy products may be produced having crystal size no bigger than 20 μm and furthermore an average crystal size of less than 15 μm. This gives smoother texture and desirable mouthfeel of the product.

DETAILED DESCRIPTION OF THE INVENTION

In the context of the present invention sugar means a component selected from the group consisting of sucrose, fructose, glucose, dextrose, lactose, etc., or sugar alcohol, such as sorbitol, xylitol, etc., or a combination thereof.

A chew has, as discussed above, a certain resistance to mastication both from flow past the teeth (toughness) and dissolution, i.e., the length of the chew. The length of the chew before full dissolution is normally a couple of minutes. Without wanting to be bound by theory, it is believed that the chewyness is a result of the molecular structure of hydrocolloid and longer oligosaccharides from syrup of sugar, such as glucose, which have the effect at low moisture content of creating high viscosity and hence the resistance to mastication.

The process steps of homogenising, concentrating, cooling, kneading and recovering discussed in the present text are well known to a person skilled in the art of sugar confection. The homogenising may, for example be performed in a conventional mixer, and the concentrating, may be done by means of a plate evaporator or other cooking device.

In a preferred embodiment of the invention, the steps of cooling, kneading and recovering are performed by means of an extruder comprising kneading zones and recovery zones. Advantageously, a twin-screw extruder is used.

Conveniently, the sugar medium is kneaded and cooled in at least one kneading zone and recovered and cooled in at least one recovery zone. Preferably, the medium is heated in the last recovery zone and/or kneading zone of the extruder.

In an especially preferred embodiment of the invention, the sugar medium is heated so that substantially all the crystal nucleation generated in the cooling, kneading and recovery step is retained. According to the invention it has surprisingly been found that this can be done to such an extent that the mass or medium is pumpable. If the mass has a temperature below 70° C. it may not be pumpable. Above 100° C. the mass is likely to boil which is undesirable for the processing thereof. Therefore, it is preferred that the mass is heated to a temperature in the range 70 to 100° C. Advantageously, the mass is heated to from 85 to 95° C., preferably to a temperature of about 90° C.

Further with reference to the product of the invention, provided is a chewy confection product comprising 90 to 95% sugar solids, 2 to 5% fat, 3 to 12% water, which confectionery product has a chewy crystalline structure having a crystal size of below 15 μm which beneficially is shaped by the above-discussed depositing or injection moulding.

In an additional embodiment of the invention, the chewy confection product is center-filled with a filling of lower viscosity than that of the chewy mass.

The invention is explained in further detail by example only with reference to the accompanying drawings and examples.

BRIEF DESCRIPTION OF THE DRAWING FIGURES

EXAMPLES AND DETAILED DESCRIPTION OF THE DRAWING FIGURES

Example 1

Base Mass

Several chewy confection base masses are prepared by mixing the following ingredients:

1) crystalline sucrose
2) water
3) glucose syrup

In addition, fat is added to prevent stickiness, lecithin is added as emulsifier, and sorbitol.

Figure 2:
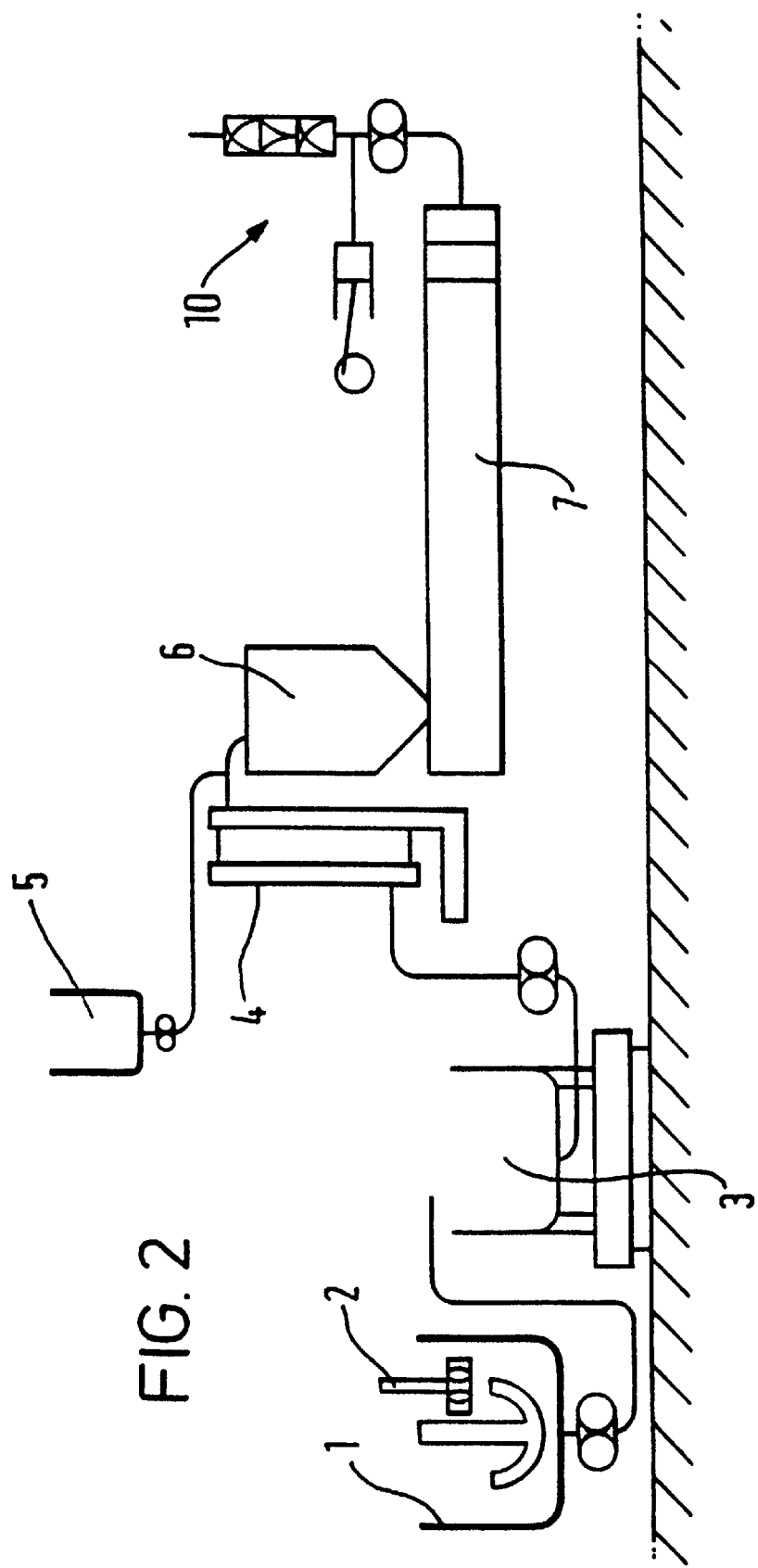
FIG. 2 is a schematic drawing illustrating the manufacturing line for the making of the pumpable crystalline mass according to the invention.

For the preparation, a line as shown in FIG. 2 is used. The crystalline sucrose and sorbitol are dissolved in the water in a dissolution tank 1. The dissolution is aided by heating and stirring. Once dissolved, the fat is melted and added. Lecithin is added to stabilise the mixture. An emulsion is formed by subjecting the ingredients to high-shear mixing by the mixer 2. After the emulsification glucose syrup is added.

The emulsion is pumped via a weighed holding tank 3 through a conventional evaporator 4 and the mass is heated to 140 to 150° C. until the moisture content is 4 to 7%.

Hydrated gelatine solution from a gelatine reservoir 5 is added to the mixture before it is introduced in a flash vessel 6. In the flash vessel 6 a separation of steam and cooked mass by lowering of the surrounding pressure is performed. Alternative hydrocolloids or polysaccharides or other texture modifying ingredients may be used to replace the gelatine.

Example 2

Base Mass

A preferred chewy confection product is prepared by mixing: (amounts given in % by weight)

1) 30 to 70% crystalline sucrose
2) 15 to 40% water
3) up to 20% sorbitol
4) up to 10% fat
5) up to 0.1% lecithin
6) up to 50% glucose syrup e.g., 42DE acid/enzyme An example of a preferred confection product: (given in dry matter, weight %)

63% Sugar
30% Glucose syrup solids
2% Sorbitol
3% Fat

The remaining part constituted by gelatine, colours and flavours. The final moisture content of the product is about 7%.

Example 3

Extrusion

Figure 1:
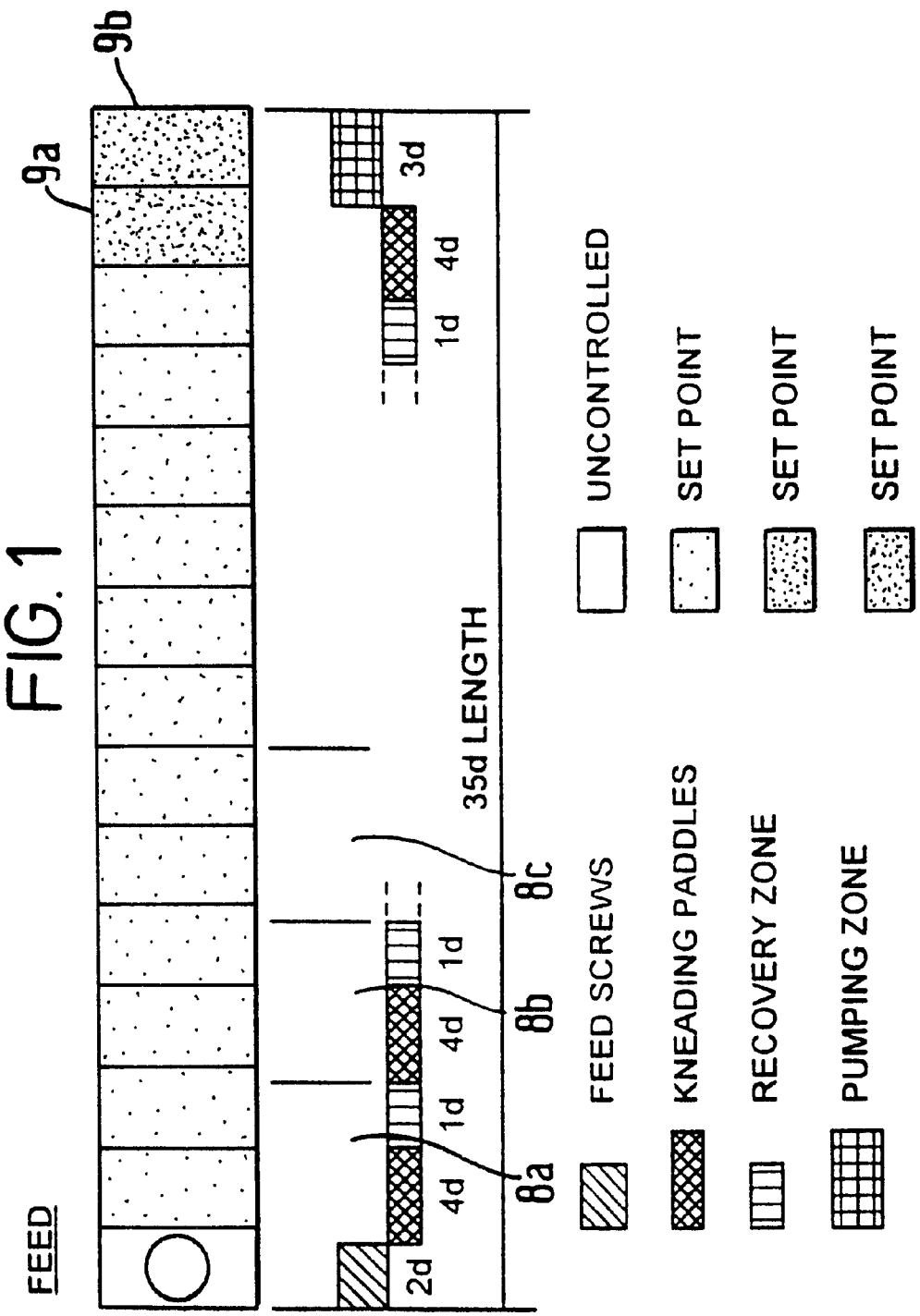
FIG. 1 is a schematic drawing illustrating a configuration of an extruder used for carrying out a method according to the invention.

In order to prepare a pumpable crystalline mass, the confectionery base mass is cooked, as previously described, before being fed into a co-rotating twin screw extruder 7 adapted in accordance with the invention, (see FIG. 1).

The mass is forwarded in the extruder 7 through 1) a plurality of kneading and recovery zones 8a, 8b, and 8c, at a temperature of 20° C. or less, followed by 2) a compression zone 9 wherein the mass is first heated to a temperature in the range of 40 to 50° C., 9a, and then to a temperature in the range of 70 to 110° C., 9b, before it leaves the extruder. More details on the extruder is given on FIG. 1.

The mass is controlled and identified as pumpable.

Example 4

Shaping

A pumpable crystalline mass is deposited into moulds and passed through a cooling tunnel for solidification. However, this is not a requirement. The products are demoulded and their texture examined. The demoulding does not distort their shape.

A pumpable crystalline mass is injection moulded and solidified. The control of the final product is the same as for the deposited product.

Example 5

Colouring & Flavouring

For colouring and flavouring, colouring and flavouring agents, e.g. fruit concentrates, or juice, or pulp, are added to the pumpable confection mass exiting the extruder. The mass is then passed through a conventional static mixer and split up into two or more streams before injection or depositing takes place (see reference 10 at FIG. 2). The texture of the final product is controlled as described above.

Alternatively, the colouring and flavouring agents may be added to the confection mass during the extrusion process.

Example 6

Crystal Size

Figure 3:
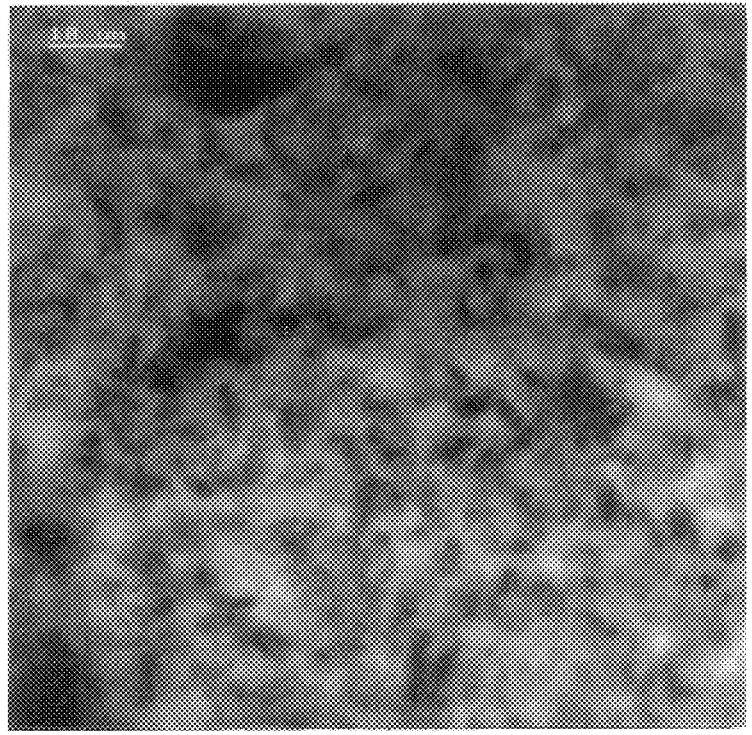
FIG. 3 and FIG. 4 are photos of the structure of chewy confection products according to the invention.
Figure 4:
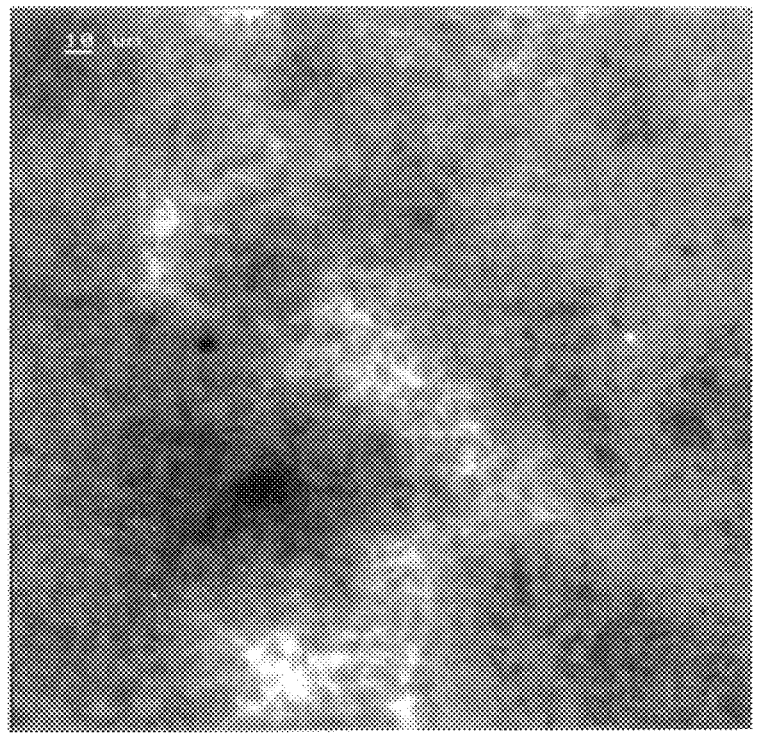
Figure 5:
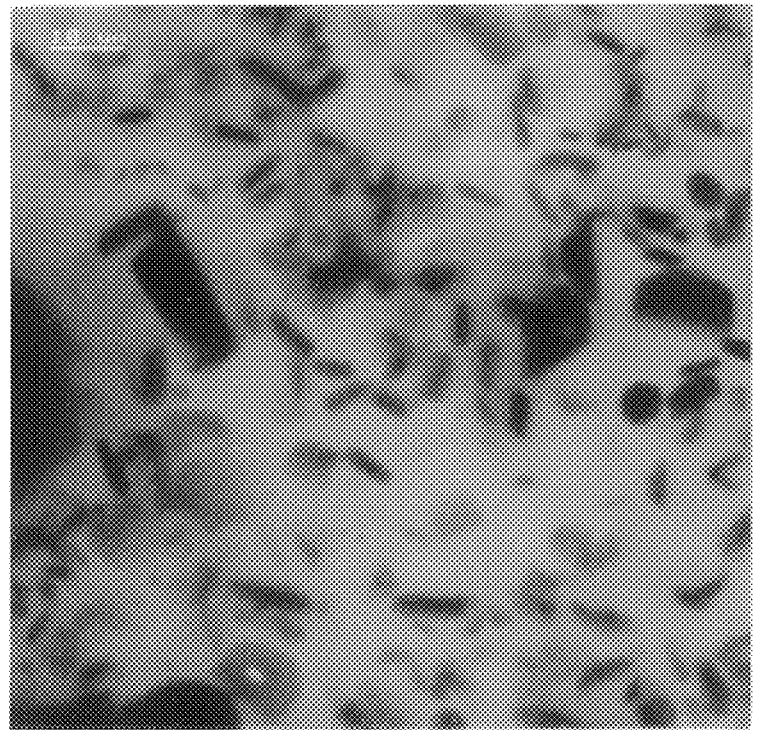
FIG. 5 and FIG. 6 are photos of chewy confection products made by conventional methods.
Figure 6:
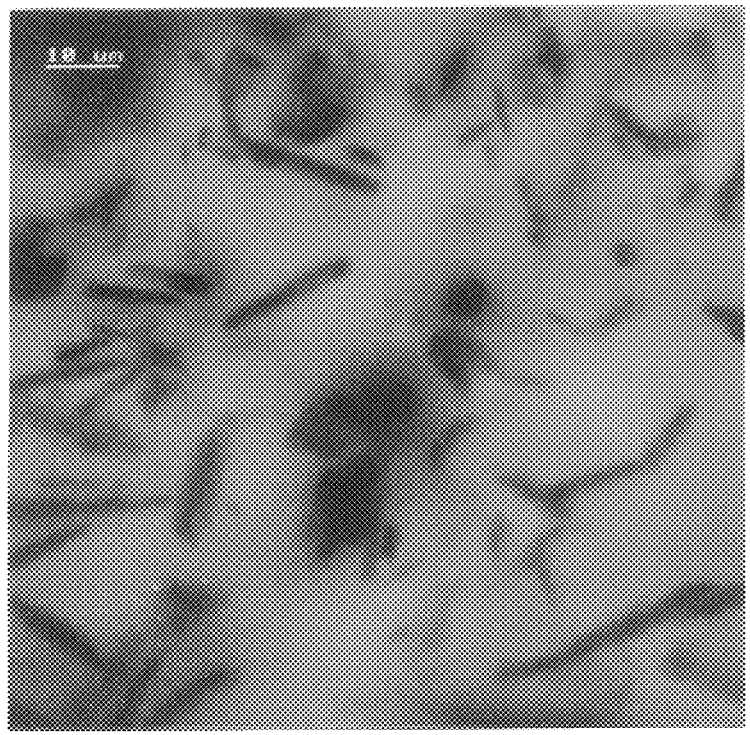

FIG. 3 and FIG. 4 are photos of the structure of chewy confection products according to the invention while FIG. 5 and FIG. 6 are photos of chewy confection products made by conventional methods. In the images, light areas represent crystal free regions, and dark areas represent crystals.

As can be seen from the photos, the crystal size of the chews in FIGS. 3 and 4 is not bigger than 20. While bigger crystals are present in both to the conventionally manufactured chews. The smaller crystals give a desirable, smoother texture and mouthfeel of the product. An estimated average crystal size in FIGS. 3 and 4 is less than 15 μm.

The crystallinity of the chews shown in FIG. 3 and FIG. 4 are from 40 to 50%, while the crystallinity of the conventional chew shown in FIG. 5 is from 35 to 40% and in FIG. 6, it is from 20 to 30%.

We claim:

1. In a process for preparing a confectionery product comprising crystallized sugar wherein the process comprises a step wherein a liquid medium comprising a sugar is prepared, a step wherein the liquid medium is heated to concentrate the liquid medium to obtain a concentrated medium and a step wherein the concentrated medium is cooled to a temperature below its sugar saturation point and kneaded and then cooled to obtain a solidified product comprising crystallized sugar, the improvements comprising:

passing the concentrated medium in an extruder and in a first step, comprising passage in the extruder, cooling and kneading the concentrated medium so that the concentrated medium is cooled to a temperature below its sugar saturation point and so that sugar crystal nucleation is induced and sugar crystal nucleates are formed and then, in a second step, comprising serial passage in the extruder, heating the cooled, kneaded product to a temperature effective to make the product pumpable and so that sugar crystal nucleates are retained in the heated product and in a third step, obtaining the heated product from the extruder and in a fourth step, cooling the heated product obtained from the extruder to obtain a solidified product.

2. A process according to claim 1 wherein the cooling and kneading step and the heating and cooling steps are carried out so that the solidified product comprises sugar crystals which have a size no bigger than 20 μm.

3. A process according to claim 2 wherein the cooling and kneading step and the heating and cooling steps are carried out so that the solidified product comprises sugar crystals which have an average size of less than 15 μm.

4. A process according to claim 1 or 2 or 3 wherein the concentrated medium is cooled to a temperature of 20° C. or less and the cooled, kneaded product then is heated to a temperature of from 70° C. to 100° C.

5. A process according to claim 1 or 2 or 3 wherein wherein the concentrated medium is cooled to a temperature of 20° C. or less and the cooled, kneaded product then is heated to a temperature of from 85° C. to 95° C.

6. A process according to claim 1 or 2 or 3 wherein the liquid medium further comprises a substance selected from the group consisting of gelatine and a hydrocolloid.

7. A process according to claim 1 or 2 or 3 wherein the liquid medium further comprises a lipid.

8. A process according to claim 1 or 2 or 3 wherein the solidified product is prepared with the liquid medium so that the solidified product comprises at least 80% sugar solids.

9. A process according to claim 1 wherein a further improvement comprises a step of packaging the solidified product and wherein between the step of cooling to obtain the solidified product and the packaging step, the process does not comprise a relaxation step.

10. A process according to claim 1 wherein a further improvement comprises passing the heated product obtained from the extruder to a mold for injection molding and cooling the heated product to obtain the solidified product.

11. A process according to claim 1 wherein a further improvement comprises passing the heated product obtained from the extruder into molds for molding and cooling the heated product to obtain the solidified product.

* * * * *